US009280882B2

(12) United States Patent
Lee et al.

(10) Patent No.: US 9,280,882 B2
(45) Date of Patent: Mar. 8, 2016

(54) TERMINAL DEVICE FOR PROVIDING HAPTIC EFFECT USING HAPTIC ENGINE AND CONTROLLING METHOD THEREFOR

(71) Applicant: Samsung Electronics Co., Ltd., Gyeonggi-do (KR)

(72) Inventors: Eun-Hwa Lee, Suwon-si (KR);
Jin-Hyoung Park, Gyeonggi-do (KR);
Yu-Dong Bae, Gyeonggi-do (KR);
Dae-Kwang Jung, Gyeonggi-do (KR);
Ji-Hoon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 94 days.

(21) Appl. No.: 14/162,281

(22) Filed: Jan. 23, 2014

(65) Prior Publication Data
US 2014/0285329 A1    Sep. 25, 2014

(30) Foreign Application Priority Data

Mar. 21, 2013  (KR) ........................ 10-2013-0030459

(51) Int. Cl.
| | |
|---|---|
| *H04B 3/36* | (2006.01) |
| *G08B 6/00* | (2006.01) |
| *G06F 1/16* | (2006.01) |
| *G06F 3/01* | (2006.01) |
| *A63F 13/92* | (2014.01) |
| *A63F 13/285* | (2014.01) |
| *A63F 13/57* | (2014.01) |

(52) U.S. Cl.
CPC ................ *G08B 6/00* (2013.01); *A63F 13/285* (2014.09); *A63F 13/57* (2014.09); *A63F 13/92* (2014.09); *G06F 1/1626* (2013.01); *G06F 3/016* (2013.01)

(58) Field of Classification Search
CPC .............. G06F 3/016; G06F 2203/014; G06F 2203/015; H04M 19/047
USPC .............. 340/407.1, 7.6, 407.2; 345/173, 156
See application file for complete search history.

(56) References Cited

U.S. PATENT DOCUMENTS

| | | | |
|---|---|---|---|
| 5,734,373 A | 3/1998 | Rosenberg et al. | |
| 6,374,255 B1 | 4/2002 | Peurach et al. | |
| 6,545,661 B1 * | 4/2003 | Goschy et al. | ................ 345/158 |
| 6,679,776 B1 * | 1/2004 | Nishiumi et al. | ................ 463/36 |
| 7,331,868 B2 * | 2/2008 | Beaulieu et al. | ................ 463/30 |
| 7,791,588 B2 | 9/2010 | Tierling et al. | |
| 8,098,234 B2 | 1/2012 | Lacroix et al. | |
| 8,378,979 B2 * | 2/2013 | Frid et al. | ...................... 345/173 |
| 8,775,957 B2 * | 7/2014 | Kim | ................ 715/765 |
| 2008/0294984 A1 | 11/2008 | Ramsay et al. | |

FOREIGN PATENT DOCUMENTS

KR    1020000058537    10/2000

OTHER PUBLICATIONS

European Search Report dated Nov. 21, 2014 issued in counterpart application No. 14153909.8-1959.

* cited by examiner

*Primary Examiner* — Phung Nguyen
(74) *Attorney, Agent, or Firm* — The Farrell Law Firm, P.C.

(57) ABSTRACT

A terminal device controlling method that provides a haptic effect using a haptic engine is provided, which includes sensing a haptic event, executing a non-physical parameter-based haptic function in a haptic engine so as to determine a vibration pattern corresponding to the haptic event, transferring the vibration pattern from the haptic engine to a device driver, and driving, through the device driver, a vibrator based on the vibration pattern so as to embody a haptic effect.

8 Claims, 12 Drawing Sheets

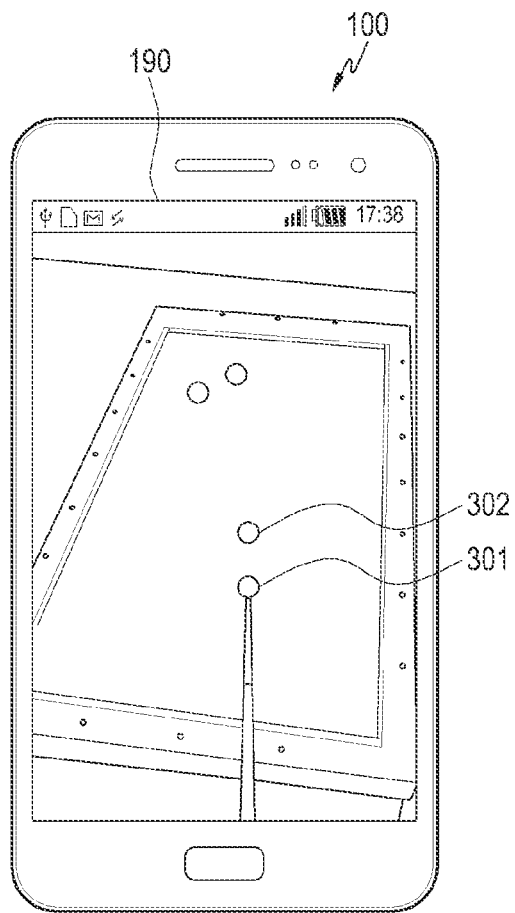
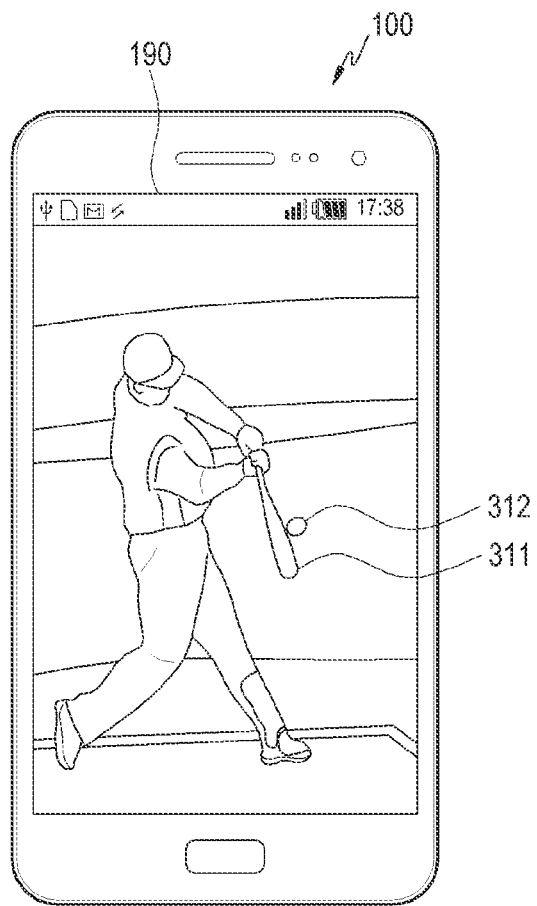
FIG.14A  FIG.14B
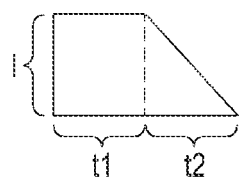
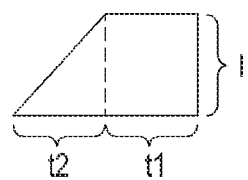
FIG.15A  FIG.15B

TERMINAL DEVICE FOR PROVIDING HAPTIC EFFECT USING HAPTIC ENGINE AND CONTROLLING METHOD THEREFOR

PRIORITY

This application claims priority under 35 U.S.C. §119(a) to Korean Application Serial No. 10-2013-0030459, which was filed in the Korean Intellectual Property Office on Mar. 21, 2013, the entire content of which is incorporated herein by reference.

BACKGROUND

1. Field of the Invention

The present invention relates to a terminal device and a controlling method therefor, and more particularly, to a terminal device that provides a haptic effect using a haptic engine and a controlling method therefor.

2. Description of the Related Art

Recently, haptic technology has been applied to terminal devices and haptic related services have been provided. The haptic technology vibrates a vibrator or motor included in the terminal device so that a user feels the vibration when a predetermined input is provided to the terminal device. That is, the haptic technology vibrates the terminal device in response to a predetermined input, so as to stimulate the user.

The haptic technology provides a haptic event such as a vibration using a simple intensity and a duration. Therefore, there is a drawback in that an application producer is provided with a vibration using a simple intensity and a duration in response to a predetermined input.

Accordingly, there is a desire for a haptic technology to which various intensities and durations are applied, and a technology for an application producer to readily embody, through easy inputting, the haptic technology to which various intensities and durations are applied.

SUMMARY

The present invention has been made to address at least the above problems and disadvantages, and to provide at least the advantages described below. Accordingly, an aspect of the present invention is to provide a technology that executes a non-physical parameter-based haptic function in a haptic engine so as to determine a vibration pattern corresponding to a haptic event, and drives a vibrator through a device driver based on the vibration pattern determined in the haptic engine, so as to embody a haptic effect.

In accordance with an aspect of the present invention, a method of controlling a terminal device that provides a haptic effect using a haptic engine is provided. The method includes sensing a haptic event; executing a non-physical parameter-based haptic function in a haptic engine so as to determine a vibration pattern corresponding to the haptic event; transferring the vibration pattern from the haptic engine to a device driver; and driving, by the device driver, a vibrator based on the vibration pattern so as to embody a haptic effect.

In accordance with an aspect of the present invention, a terminal device that provides a haptic effect using a haptic engine is provided. The terminal device includes a controller configured to sense a haptic event; execute a non-physical parameter-based haptic function in a haptic engine so as to determine a vibration pattern corresponding to the haptic event; transfer the vibration pattern from the haptic engine to a device driver; and drive a vibrator through the device driver based on the vibration pattern so as to embody a haptic effect; the vibrator that vibrates the terminal device; and a storage unit that stores the vibration pattern corresponding to the haptic event.

BRIEF DESCRIPTION OF THE DRAWINGS

The above and other aspects, features, and advantages of the present invention will be more apparent from the following detailed description taken in conjunction with the accompanying drawings, in which:

FIGS. 14A and 14B illustrate screens in which a haptic event occurs according to a second embodiment and a third embodiment of the present invention, respectively; and FIGS. 15A and 15B illustrate a haptic pattern according to the second embodiment and the third embodiment of the present invention, respectively.

DETAILED DESCRIPTION OF EMBODIMENTS OF THE PRESENT INVENTION

Various embodiments will now be described more fully with reference to the accompanying drawings in which some example embodiments are shown. However, the embodiments do not limit the present disclosure to a specific implementation, but should be construed as including all modifications, equivalents, and replacements included in the spirit and scope of the present disclosure. For example, referring to FIG. 1, the haptic engine 114 and the device driver 115 has been exemplified to be included in the controller 110, but the haptic engine 114 and the device driver 115 may be provided separate from the controller 110.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more of the associated listed items.

The terms used in this application are for the purpose of describing particular embodiments only and are not intended to limit the disclosure. As used herein, the singular forms are intended to include the plural forms as well, unless the context clearly indicates otherwise. Terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
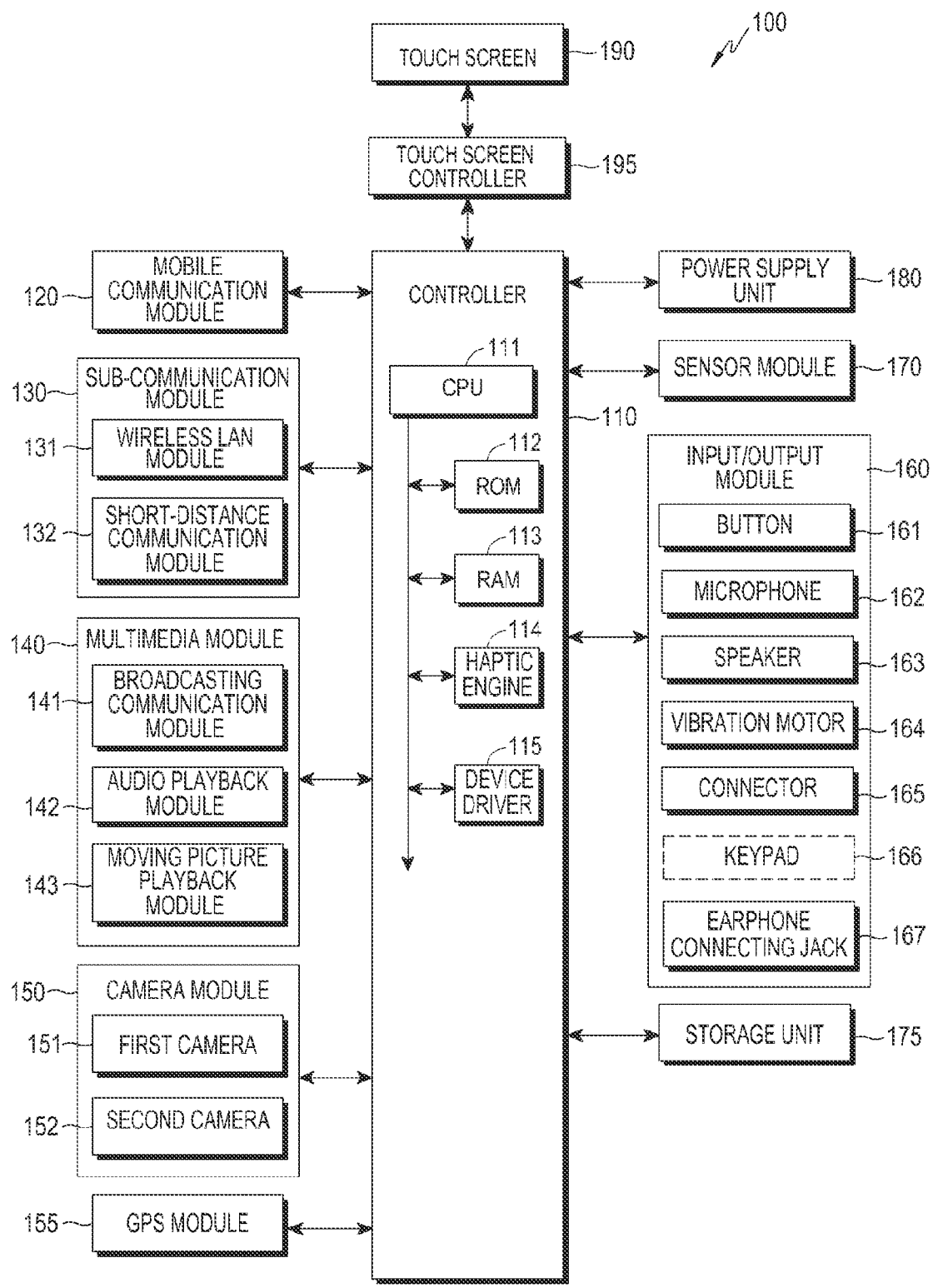
FIG. 1 is a block diagram schematically illustrating a terminal device according to an embodiment of the present invention.

FIG. 1 is a block diagram schematically illustrating a terminal apparatus according to an embodiment of the present invention.

Referring to FIG. 1, the apparatus 100 can be connected to an external device (not shown) by using an external device connector such as a sub communication module 130, a connector 165, and an earphone connecting jack 167. The "external device" includes various devices attached to or detached from the apparatus 100 through a cable, such as an earphone, an external speaker, a Universal Serial Bus (USB) memory, a charger, a cradle, a docking station, a DMB antenna, a mobile payment related device, a health management device (blood sugar tester or the like), a game machine, a car navigation device and the like. Further, the "external device" may include a Bluetooth communication device, a short distance communication device such as a Near Field Communication (NFC) device, a WiFi Direct communication device, and a wireless Access Point (AC) which may be wirelessly connected to the apparatus 100. In addition, the external device may include another device, a mobile phone, a smart phone, a tablet PC, a desktop PC, and a server.

Referring to FIG. 1, the mobile apparatus 100 includes a display unit such as a touch screen 190 and a display controller such as a touch screen controller 195. Further, the apparatus 100 includes a controller 110, a mobile communication module 120, a sub communication module 130, a multimedia module 140, a camera module 150, a GPS module 155, an input/output module 160, a sensor module 170, a storage unit 175, and a power supply unit 180. The sub communication module 130 includes at least one of a wireless LAN module 131 and a short distance communication module 132, and the multimedia module 140 includes at least one of a broadcasting communication module 141, an audio playback module 142, and a video or motion picture playback module 143. The camera module 150 includes at least one of a first camera 151 and a second camera 152. The input/output module 160 includes at least one of a button 161, a microphone 162, a speaker 163, a vibrator 164, a connector 165, a keypad 166, and an earphone connecting jack 167. Hereinbelow, descriptions will be made as to a case where the display unit 190 and the display controller 195 are a touch screen and a touch screen controller, respectively, by way of an example.

The controller 110 may include a CPU 111, a Read Only Memory (ROM) 112 storing a control program for controlling the apparatus 100, and a Random Access Memory (RAM) 113 used as a storage area for storing a signal or data input from the outside of the apparatus 100 or for an operation performed in the apparatus 100. The CPU 111 may include a single core, a dual core, a triple core, or a quad core. The CPU 111, the ROM 112 and the RAM 113 may be connected with each other through internal buses. Also the controller 110 may include a haptic engine 114 and a device driver 115.

The controller 110 controls the mobile communication module 120, the sub communication module 130, the multimedia module 140, the camera module 150, the input/output module 160, the sensor module 170, the storage unit 175, the power supply unit 180, the touch screen 190, and the touch screen controller 195.

The mobile communication module 120 enables the apparatus 100 to be connected with an external device through mobile communication by using one antenna or a plurality of antennas according to a control of the controller 110. The mobile communication module 120 transmits/receives a wireless signal for a voice call, a video call, a Short Message Service (SMS), or a Multimedia Message Service (MMS) to/from a mobile phone, a smart phone, a tablet PC, or another device having a phone number input into the apparatus 100.

The sub-communication module 130 may include at least one of the wireless LAN module 131 and the local area communication module 132. For example, the sub-communication module 130 may include only the wireless LAN module 131, only the local area communication module 132, or both the wireless LAN module 131 and the local area communication module 132.

The wireless LAN module 131 may be Internet-connected in a place where a wireless Access Point (AP) is installed according to a control of the controller 110. The wireless LAN module 131 supports a wireless LAN standard (IEEE802.11x) of the Institute of Electrical and Electronics Engineers (IEEE). The short distance communication module 132 may wirelessly perform short distance communication between the apparatus 100 and an image forming apparatus according to a control of the controller 110. A short distance communication scheme may include Bluetooth, Infrared Data Association (IrDA) communication, WiFi-Direct communication, Near Field Communication (NFC) and the like.

The apparatus 100 may include at least one of the mobile communication module 120, the wireless LAN module 131, and the short distance communication module 132. For example, the apparatus 100 may include a combination of the mobile communication module 120, the wireless LAN module 131, and the short distance communication module 132 according to a capability thereof.

The multimedia module 140 may include the broadcasting communication module 141, the audio playback module 142 and the moving picture playback module 143. The broadcasting communication module 141 can receive a broadcasting signal (for example, a TV broadcasting signal, a radio broadcasting signal, or a data broadcasting signal) and broadcasting supplement information (for example, Electric Program Guide (EPG) or Electric Service Guide (ESG)) output from a broadcasting station through a broadcasting communication antenna according to a control of the controller 110. The audio playback module 142 may reproduce a digital audio file (for example, a file having a file extension of mp3, wma, ogg, or wav) stored or received according to a control of the controller 110. The moving picture playback module 143 may reproduce a stored or received digital moving image file (e.g., a file of which the file extension is mpeg, mpg, mp4, avi, mov, or mkv) according to the control of the control unit 110. The moving picture playback module 143 may reproduce a digital audio file.

The multimedia module 140 may include the audio playback module 142 and the moving picture playback module 143 without the broadcasting communication module 141. Further, the audio playback module 142 or the motion picture playback module 143 of the multimedia module 140 may be included in the controller 110.

The camera module 150 may include at least one of the first camera 151 and the second camera 152 each of which photographs a still image or a moving image according to the control of the control unit 110. Further, the first camera 151 or the second camera 152 may include an auxiliary light source (for example, a flash providing light required for the photographing. The first camera 151 may be disposed on a front surface of the apparatus 100, and the second camera 152 may be disposed on a back surface of the apparatus 100. In addition, the first camera 151 and the second camera 152 may be disposed to be adjacent to each other (for example, an interval between the first camera 151 and the second camera 152 is larger than 1 cm or smaller than 8 cm), and thus a three-dimensional still image or a three-dimensional video may be photographed.

The GPS module 155 may receive radio waves from a plurality of GPS satellites in the Earth's orbit and calculate a position of the apparatus 100 by using Time of Arrival from the GPS satellites to the apparatus 100.

The button 161 of the input/output module 160 may be formed on a front surface, a side surface, or a back surface of a housing of the apparatus 100, and may include at least one of a power/lock button, a volume button, a menu button, a home button, a back button, and a search button.

The microphone 162 receives a voice or a sound to generate an electrical signal according to a control of the controller 110. The speaker 163 may output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the apparatus 100 according to a control of the controller 110.

The speaker 163 may output a sound (for example, button tone corresponding to a phone call or ringing tone) corresponding to a function performed by the apparatus 100. One or more speakers 163 may be formed in a proper position or positions of the housing of the apparatus 100.

The vibrator 164 converts an electronic signal to mechanical vibration according to the control of the control unit 110, and may include a vibration motor. For example, when the apparatus 100 in a vibration mode receives a voice call from another device, the vibrator 164 is operated. At least one vibrator 164 may be formed within a housing of the device 100. The vibrator 164 may be operated in response to a user's touch action on the touch screen 190 or a continuous touch movement on the touch screen 190.

The connector 165 may be used as an interface for connecting the apparatus 100 with an external device or a power source. The apparatus 100 may transmit or receive data stored in the storage unit 175 to or from an external device through a wired cable connected to the connector 165 according to a control of the controller 110. The external device may be a docking station, and the data may be an input signal transmitted from an external input device, for example, a mouse, a keyboard or the like. Further, the apparatus 100 may receive power from a power source through the wired cable connected to the connector 165 or charge a battery by using the power source.

The keypad 166 may receive a key input from the user to control the apparatus 100. The keypad 166 includes a physical keypad formed on the mobile apparatus 100 or a virtual keypad) displayed on the touch screen 190. The physical keypad formed in the apparatus 100 may be omitted according to a capability or structure of the apparatus 100.

An earphone may be inserted into the earphone connecting jack 167 to be connected with apparatus 100.

The sensor module 170 includes at least one sensor for detecting a state of the apparatus 100. For example, the sensor module 170 includes at least one of a proximity sensor for detecting whether the user approaches the apparatus 100 and a luminance sensor for detecting an amount of ambient light of the apparatus 100. Also, the sensor module 170 may include a gyro sensor. The gyro sensor may detect the operation of the mobile apparatus 100 (e.g., rotation of the mobile apparatus 100, or acceleration or vibration applied to the mobile apparatus 100), may detect a point of the compass using the magnetic field on Earth, or may detect a gravity acting direction. Further, the sensor module 170 includes an altimeter for measuring an atmospheric pressure to detect an altitude. At least one of the sensors can detect the state, generate a signal corresponding to the detection, and transmit the generated signal to the controller 110. At least one of the sensors of the sensor module 170 may be added or omitted according to the capability of the apparatus 100.

The storage unit 175 stores signals or data input/output in response to the operations of the mobile communication module 120, the sub-communication module 130, the multimedia module 140, the camera module 150, the GPS module 155, the input/output module 160, the sensor module 170, and the touch screen 190 according to the control of the control unit 110. The storage unit 175 stores a control program and applications for controlling the apparatus 100 or the controller 110. The term "storage unit" includes the storage unit 175, the ROM 112 and the RAM 113 within the controller 110, or a memory card (for example, an SD card or a memory stick) installed in the apparatus 100. The storage unit may include a non-volatile memory, a volatile memory, an HDD (Hard Disc Drive) or an SSD (Solid State Drive).

The power supply unit 180 supplies power to one or more batteries arranged in the housing of the apparatus 100 according to a control of the controller 110. The one or more batteries supply power to the apparatus 100. Further, the power supply unit 180 may supply power input from an external power source through a wired cable connected to the connector 165 to the apparatus 100. In addition, the power supply unit 180 may supply power wirelessly input from the external power source through a wireless charging technology to the apparatus 100.

The touch screen 190 provides a user interface corresponding to various services (for example, phone communication, data transmission, broadcasting, and photographing a picture) to the user. The touch screen 190 transmits an analog signal corresponding to at least one touch input into the user interface to the touch screen controller 195. The touch screen 190 may receive at least one touch through a body part of the user (for example, the fingers) or a touchable input means. Also, the touch screen 190 may receive a continuous motion of one touch. The touch screen 190 transmits an analog signal corresponding to the continuous movement of the touch input thereto to the touch screen controller 195.

Herein, the touch is not limited to a contact between the touch screen 190 and the user's body or a touchable input means and may include a contactless touch. The detectable interval of the touch screen 190 may be changed according to a capability or structure of the portable terminal 100.

The touch screen 190 may be implemented in, for example, a resistive type, a capacitive type, an infrared type, or an acoustic wave type.

The touch screen controller 195 converts the analog signal received from the touch screen 190 to a digital signal (for example, X and Y coordinates) and transmits the digital signal to the controller 110. The controller 110 may control the touch screen 190 by using the digital signal received from the touch screen controller 195. For example, the control unit 110 may cause a shortcut icon displayed on the touch screen 190 to be selected or may execute the shortcut icon in response to a touch. Further, the touch screen controller 195 may be included in the controller 110.

Figure 2:
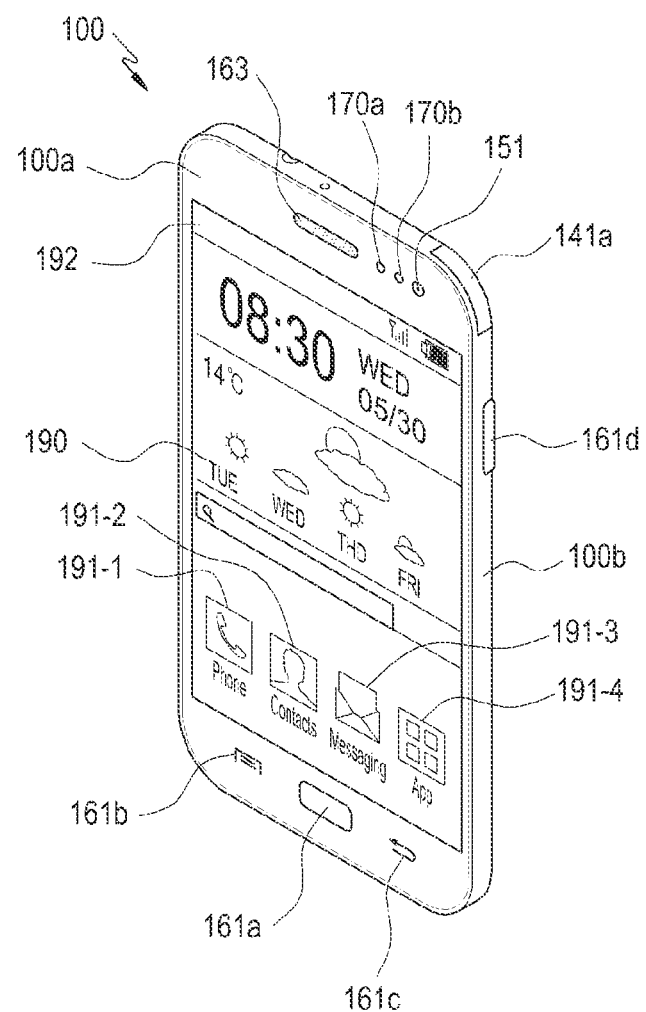
FIG. 2 is a front perspective view of a terminal device according to an embodiment of the present invention.
Figure 3:
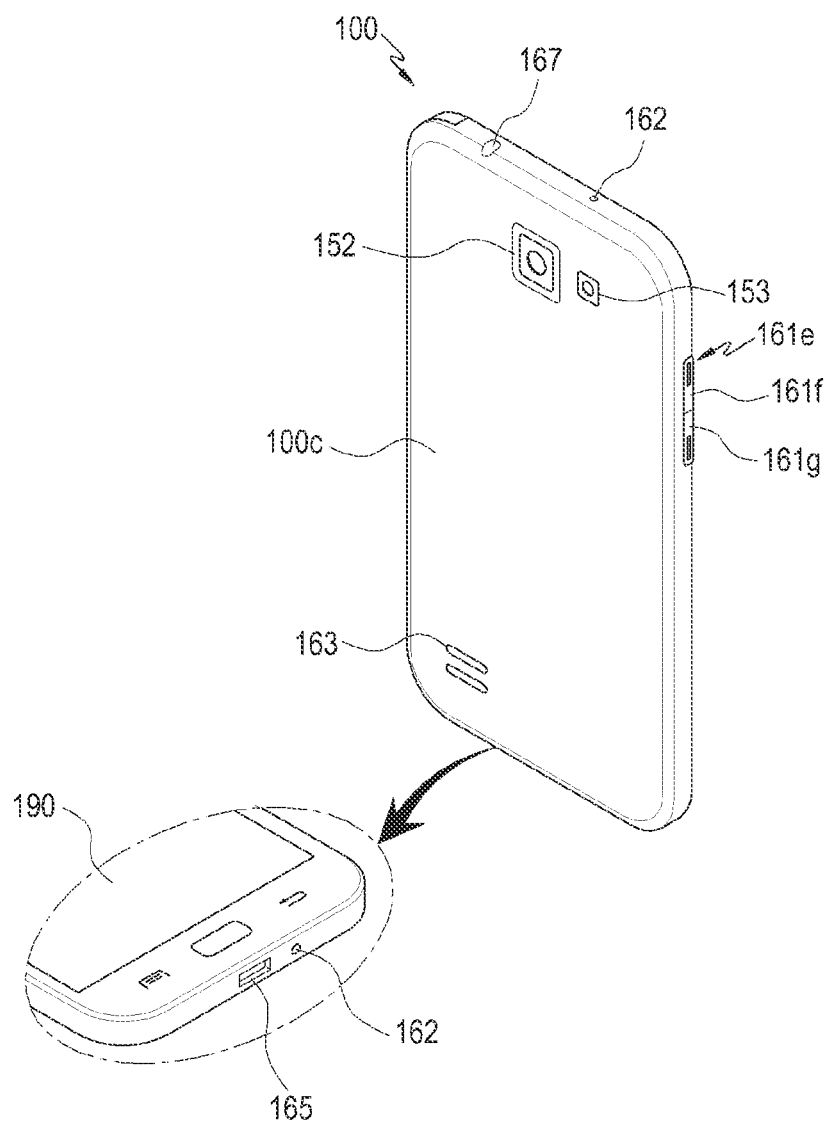
FIG. 3 is a rear perspective view of a terminal device according to an embodiment of the present invention.

FIG. 2 is a front perspective view of a terminal apparatus according to an embodiment of the present invention. FIG. 3 is a rear perspective view of the terminal apparatus.

Referring to FIG. 2, a touch screen 190 is arranged at the center of the front surface 100a of the terminal apparatus 100. The touch screen 190 is formed in a large size so that the touch screen 190 occupies almost all the front surface 100a of the mobile apparatus 100. FIG. 2 shows an example where a main home screen is displayed on the touch screen 190. The main home screen is the first screen displayed on the touch screen 190 when the mobile apparatus 100 is turned ON. When the mobile apparatus 100 includes a plurality of pages of different home screens, the main home screen may be the first home screen among the plurality of pages of home screens. Shortcut icons 191-1, 191-2, and 191-3 for executing frequently used applications, an application switching key 191-4, time, weather and the like may be displayed on the home screen. The application switching key 191-4 displays on the screen application icons that indicate applications on the touch screen 190. At the top end of the touch screen 190, a status bar 192 may be formed that indicates the status of the mobile apparatus 100 such as the battery charge status, the intensity of a received signal, and current time.

A home button 161a, a menu button 161b, and a back button 161c may be formed at the lower part of the touch screen 190.

The home button 161a displays the main home screen on the touch screen 190. For example, when the home button 161a is pressed (or touched) in a state where any home screen different from the main home screen or a menu screen is displayed on the touch screen 190, the main home screen is displayed on the touch screen 190. In addition, when the home button 161a is pressed (or touched) while an application is being executed on the touch screen 190, the main home screen illustrated in FIG. 2 is displayed on the touch screen 190. In addition, the home button 161a may be used to display recently used applications or a task manager on the touch screen 190.

The menu button 161b provides a connection menu which can be used on the touch screen 190. The connection menu includes a widget addition menu, a background changing menu, a search menu, an editing menu, an environment setup menu and the like. In addition, when an application is executed, the menu button 161b may provide a connection menu connected to the application.

The back button 161c can be used for displaying the screen which was executed just before the currently executed screen or terminating the most recently used application.

The first camera 151, an illumination sensor 170a, and a proximity sensor 170b may be disposed on edges of the front surface 100a of the apparatus 100. The second camera 152, the flash 153, and the speaker 163 may be disposed on a rear surface 100c of the apparatus 100, as shown in FIG. 3.

On the side surfaces 100b of the mobile apparatus 100, for example, a power/reset button 161d, a volume button 161e, a terrestrial DMB antenna 141a that receives broadcasting, and one or more microphones 162 may be arranged. The DMB antenna 141a may be formed to be fixed or detachably mounted on the mobile apparatus 100.

Further, the connector 165 is formed on a lower side surface of the apparatus 100. A plurality of electrodes are formed in the connector 165, and the connector 165 may be connected to an external device through a wire. The earphone connecting jack 167 may be formed on an upper side surface of the apparatus 100. An earphone may be inserted into the earphone connecting jack 167.

Figure 4:
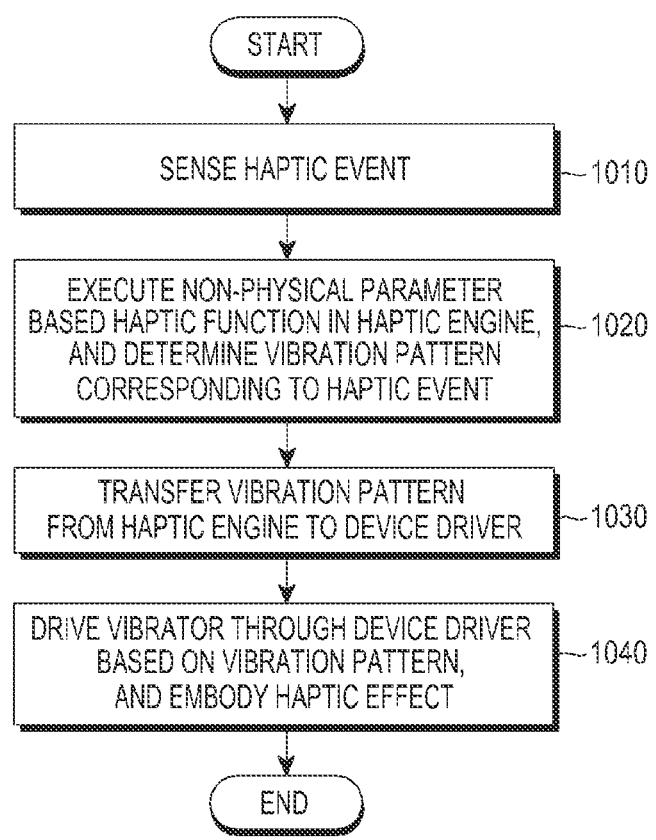
FIG. 4 is a flowchart illustrating a terminal device controlling method that provides a haptic effect using a haptic engine according to an embodiment of the present invention.

FIG. 4 is a flowchart illustrating a terminal device controlling method that provides a haptic effect using a haptic engine according to an embodiment of the present invention.

Referring to FIG. 4, the terminal device controlling method that provides a haptic effect using a haptic engine senses a haptic event in step 1010, according to the controller 110 of the terminal device 100. The haptic event may be designated in advance and stored in the storage unit 175. The haptic event may occur in an application that is being executed in the terminal device 100. For example, the haptic event may occur while a game application is executed.

Figures 5A, 5B:
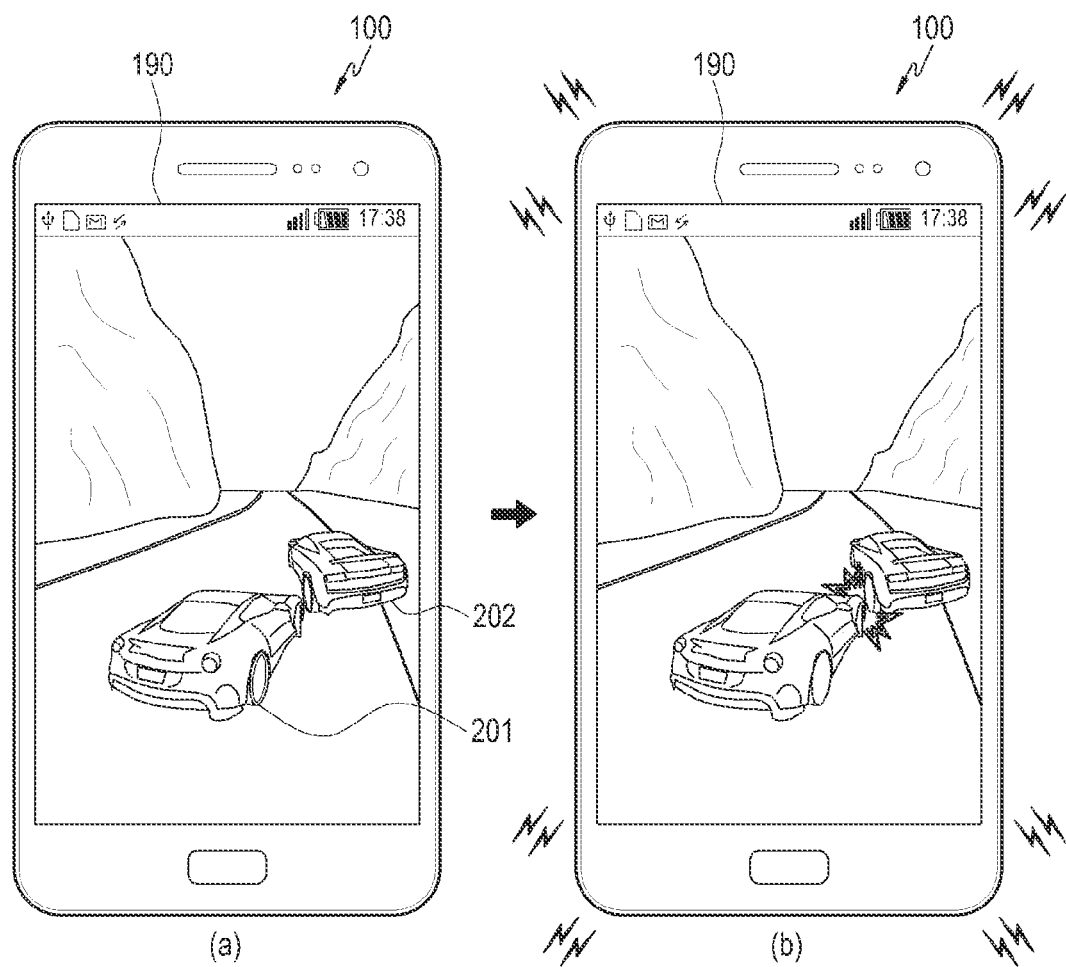
FIGS. 5A and 5B illustrate screens in which a haptic event occurs according to an embodiment of the present invention.

FIGS. 5A and 5B illustrate screens in which a haptic event occurs according to an embodiment of the present invention. Referring to FIG. 5, a game application is executed in the terminal device 100, such as, for example, a car racing game. In this example, the haptic event may be a collision between cars in the game that may occur while the car racing game application is executed. That is, the haptic event may correspond to a collision event. For example, as shown in FIG. 5A, a collision event between a first car 201 and a second car 202 may be an example of the haptic event. As described above, the collision event corresponding to the haptic event may be designated in advance and may be stored in the storage unit 175. Therefore, the controller 110 may sense that the collision event corresponding to the haptic event has occurred.

Referring back to FIG. 4, subsequently, the method executes a non-physical parameter-based haptic function in the haptic engine so as to determine a vibration pattern corresponding to the haptic event in step 1020. The controller 110 controls the haptic engine so as to execute the non-physical parameter-based haptic function in the haptic engine, and determines the vibration pattern corresponding to the haptic event. In this example, the haptic function may be a non-physical parameter-based haptic function or a physical parameter-based haptic function. The non-physical parameter-based haptic function indicates a haptic function that is used for a haptic event that occurs in an environment that is different from a physical environment. The physical parameter-based haptic function indicates a haptic function that is used for a haptic event that occurs in a physical environment. The term "physical environment" refers to an environment where the haptic event may occur in the real world according to the laws of physics, whereas the term "non-physical environment" refers to an environment that does not correspond to the physical environment.

The non-physical parameter-based haptic function may be determined through at least one classification. In this example, the non-physical parameter based haptic function may be determined through a broad classification, an intermediate classification, and a fine classification. For example, the non-physical parameter-based haptic function may be determined to be HapticNP(V1, V2, V3). HapticNP(V1, V2, V3) indicates a non-physical parameter-based haptic function. V1 denotes a parameter of a broad classification, V2 denotes a parameter of an intermediate classification, and V3 denotes a parameter of a fine classification. The broad classification, the intermediate classification, and the fine classification, may be classified, for example, as shown in Table 1.

TABLE 1

| Broad classification | | Intermediate classification | | Fine Classification 1 | | Fine Classification 2 | | Example |
|---|---|---|---|---|---|---|---|---|
| Collision | A | between hard objects | a | weight: light object | a1 | impact: H/M/L | H/M/L | a baseball and a bat between cars |
| | | | | heavy object | a2 | | | |
| | | between hard and soft objects | b | weight: light object | b1 | impact: H/M/L | H/M/L | |
| | | | | heavy object | b2 | | | |
| Fire | B | pistol | a | impact: H/M/L | | | | |
| | | big gun | b | impact: H/M/L | | | | |
| | | Cannon | c | impact: H/M/L | | | | |

Referring to Table 1, the at least one classification includes a broad classification for determining a function, an intermediate classification for determining a detailed category, and a fine classification for determining selection of a situation. For example, as shown in Table 1, the broad classification may determine a function of a haptic event such as 'collision' and 'fire'. The intermediate classification may determine a detailed category of the broad classification, such as, "between hard objects (a)" and "between hard and soft objects (b)". The fine classification may determine selection of a situation such as a situation in which a weight is heavy, a situation in which a weight is light, or a situation in which an impact is heavy/medium/light (H/M/L).

Referring to Table 1, the non-physical parameter-based haptic function may be classified through a broad classification, for example, "collision (A)", "fire (B)", and the like. The broad classification such as "collision (A)" may be classified through an intermediate classification such as "between hard objects(a)" and "between hard and soft objects (b)". The intermediate classification may be classified through a fine classification such as "a situation in which an object is light (a1)" and "a situation in which an object is heavy (a2)". Also, the intermediate classification may be classified through a fine classification such as "a situation in which an impact is H/M/L".

Also, the broad classification such as "fire (B)" may be classified through an intermediate classification such as a "pistol (a)", a "big gun(b)", and a "cannon(c)". The intermediate classification may be classified through a fine classification such as "a situation in which an impact is H/M/L".

For example, when the broad classification is "collision (A)", the intermediate classification is "between hard objects (a)", and the fine classification is "a situation in which an object is light(a1)", the non-physical parameter-based haptic function may be determined to be HapticNP(A, a, a1).

As another example, when the broad classification is "fire (B)", the intermediate classification is "cannon (c)", and the fine classification is "a situation in which an impact is 'M'", the non-physical parameter-based haptic function may be determined to be HapticNP(B, c, M).

Figure 6:
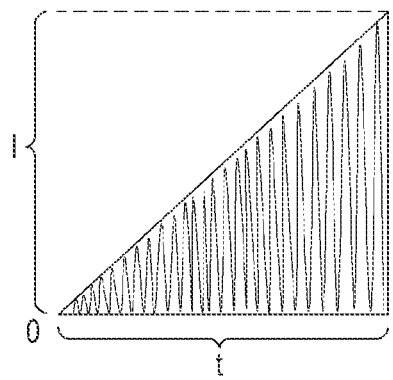
FIG. 6 is a diagram illustrating a haptic pattern according to an embodiment of the present invention.

The non-physical parameter-based haptic function determined through the at least one classification may have a predetermined haptic pattern. That is, the storage unit 175 stores a predetermined haptic pattern corresponding to the non-physical parameter-based haptic function determined through the at least one classification. For example, when the non-physical parameter-based haptic function determined through the at least one classification is HapticNP(A, a, a1), a predetermined haptic pattern corresponding to the non-physical parameter-based haptic function HapticNP(A, a, a1) may be stored in the storage unit 175. For example, the haptic pattern may be a haptic pattern illustrated in FIG. 6. Referring to FIG. 6, the haptic pattern may be formed having a vertical axis indicating an intensity (I) and a horizontal axis indicating a duration (t). That is, the haptic pattern illustrated in FIG. 6 corresponds to a haptic pattern of which an intensity of a vibration gradually increases from 0 to I during a time from 0 to t. The haptic pattern may include a frequency (f). Therefore, the haptic pattern corresponds to the frequency (f), and has a vibration of which an intensity gradually increases from 0 to I during a time from 0 to t.

Figure 7:
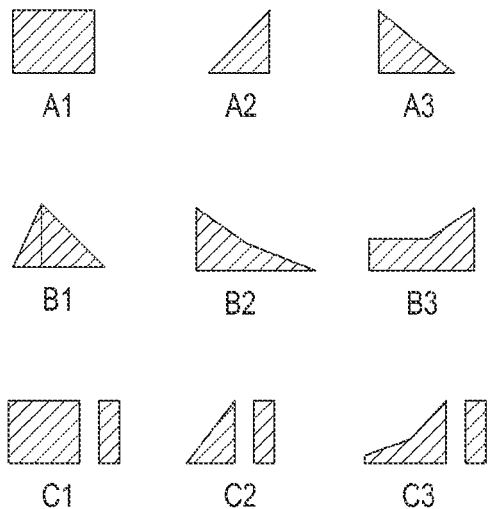
FIG. 7 is a diagram illustrating haptic patterns according to an embodiment of the present invention.

The haptic pattern may be a combination of a plurality of predetermined haptic patterns. FIG. 7 illustrates haptic patterns. In FIG. 7, haptic patterns A1, A2, and A3 correspond to a plurality of predetermined haptic patterns. Haptic patterns B1 through C3 correspond to haptic patterns formed of a combination of the plurality of predetermined haptic patterns. Referring to FIG. 7, haptic pattern A1 is a haptic pattern provided in a rectangular shape, haptic pattern A2 is a haptic pattern provided in a right triangular shape of which an intensity gradually increases over time, and the haptic pattern A3 is a haptic pattern provided in a right triangular shape of which an intensity gradually decreases over time. In this example, the haptic patterns B1 through C3 may be formed of a combination of the plurality of predetermined haptic patterns. For example, the haptic pattern B1 is formed of a combination of the haptic pattern A2 and the haptic pattern A3. As another example, the haptic pattern C1 is formed of two haptic pattern A1s.

In this example, the controller 110 determines a frequency or a haptic pattern based on the intermediate classification, and determines an intensity or a duration based on the fine classification. That is, a frequency or a haptic pattern predetermined based on the intermediate classification may be determined, and an intensity or a duration predetermined based on the fine classification may be determined. For example, when the non-physical parameter-based haptic function is HapticNP(A, a, a1), the intermediate classification is "between hard objects (a)" and the fine classification is "a situation in which an object is light (a1)". In this example, a frequency and a haptic pattern that are predetermined based on the intermediate classification that reads "between hard object (a)" may be "60" and the haptic pattern of FIG. 6, respectively. An intensity and a duration that are predetermined based on the fine classification that reads "a situation in which an object is light (a1)" may be "10" and "5 seconds", respectively. Therefore, the controller 110 may determine the vibration pattern corresponding to the haptic event, based on the predetermined frequency, haptic pattern, intensity, or duration.

Briefly, the controller 110 controls the haptic engine so as to execute the non-physical parameter-based haptic function, and determines the haptic pattern. In this example, the non-physical parameter-based haptic function may be determined through at least one classification, such as, a broad classification, an intermediate classification, and a fine classification. The non-physical parameter-based haptic function may have a predetermined haptic pattern. In this example, a frequency or a haptic pattern predetermined based the intermediate classification may be determined, and an intensity or a duration predetermined based on the fine classification may be determined. Therefore, the controller 110 executes the non-physical parameter-based haptic function so as to determine an intensity, a duration, and a frequency with respect to the determined haptic pattern, and determines the vibration pattern corresponding to the haptic event.

Therefore, according to an embodiment of the present disclosure, the present invention has an advantage of determining a vibration pattern corresponding to a haptic event by executing a non-physical parameter-based haptic function in a haptic engine.

Referring again to FIG. 4, the method then transfers the vibration pattern from the haptic engine to the device driver in step The controller 110 transfers the vibration pattern determined in the haptic engine to the device driver.

A haptic effect is embodied by driving a vibrator through the device driver based on the vibration pattern in step 1040. The controller 110 controls the device driver to drive the vibrator 164 based on the vibration pattern and embodies a haptic effect. For example, as illustrated in FIG. 5B, the controller 110 controls the device driver to drive the vibrator 164 based on the vibration pattern corresponding to the haptic event received from the haptic engine, and embodies a haptic effect by vibrating the terminal device 100. That is, as illustrated in FIG. 5B, the vibrator 164 is driven based on a vibration pattern corresponding to a collision event occurring while the car racing game application is executed, so that a haptic effect is embodied by vibrating the terminal device 100.

Figure 8:
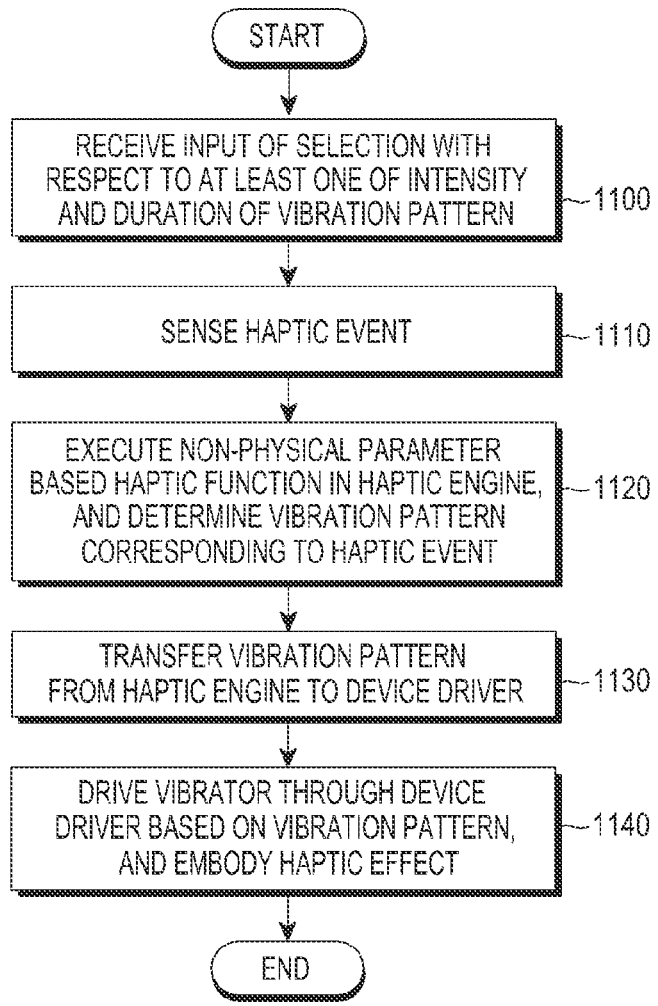
FIG. 8 is a flowchart illustrating a terminal device controlling method that provides a haptic effect using a haptic engine according to another embodiment of the present invention.

FIG. 8 is a flowchart of a terminal device controlling method that provides a haptic effect using a haptic engine according to another embodiment of the present invention.

Referring to FIG. 8, an input of selection with respect to at least one of an intensity and a duration of a vibration pattern is received in step 1100. The controller 110 may receive an input of selection with respect to at least one of an intensity and a duration of a vibration pattern through the input/output module 160, or for example, through the touch screen 190.

Figures 9A, 9B:
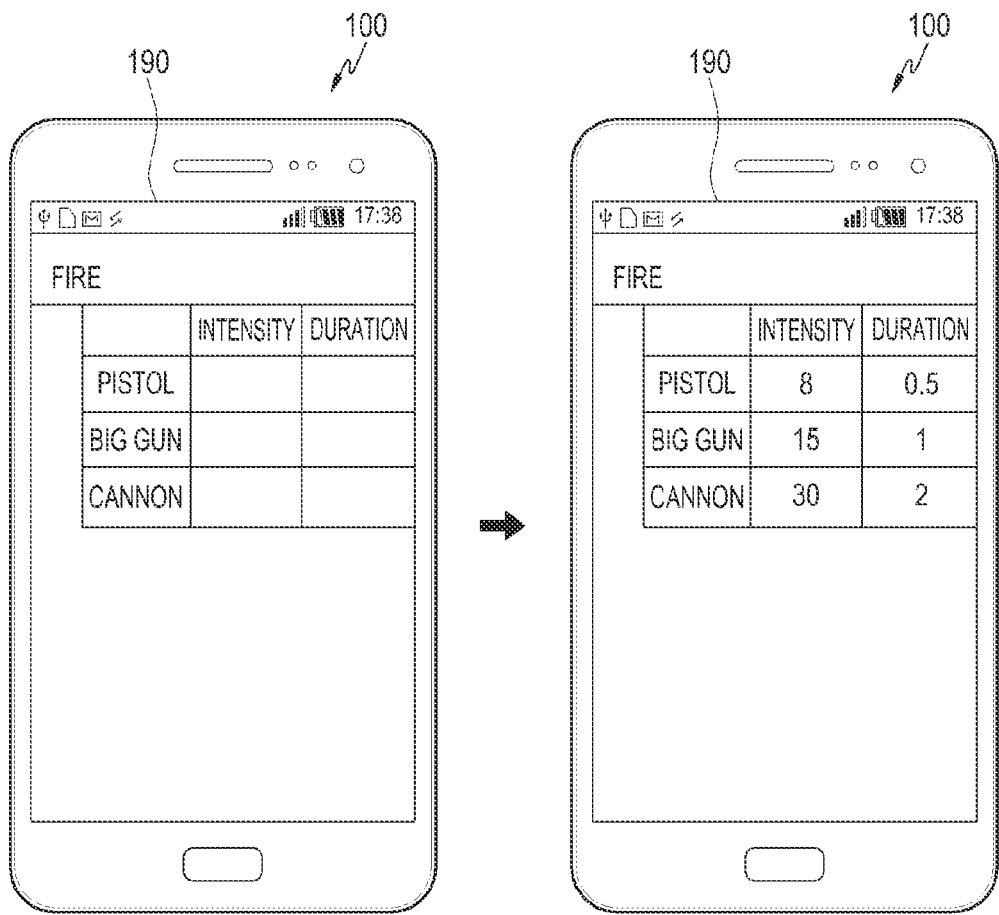
FIGS. 9A and 9B illustrate screens that receive an input of selection with respect to at least one of an intensity and a duration of a vibration pattern according to another embodiment of the present invention.

FIGS. 9A and 9B illustrate screens that receive an input of selection with respect to an intensity and a duration of a vibration pattern according to another embodiment of the present invention. Referring to FIG. 9A, intensities and durations of vibration patterns that are classified as a "pistol", a "big gun", and a "cannon" which belong to "fire" among haptic events may be received through the touch screen 190. That is, a user may input the intensities and the durations of the vibration patterns that are classified as the "pistol", the "big gun", and the "cannon" which belong to "fire", into the touch screen 190 through a touch, so that the user may directly select a desired intensity and duration of a vibration pattern. For example, as shown in FIG. 9B, an intensity and a duration of a vibration pattern for the "pistol" included in "fire" may be input as "8" and "0.5 seconds", respectively. An intensity and a duration of a vibration pattern for the "big gun" may be input as "15" and "1 second", respectively. An intensity and a duration of a vibration pattern for the "cannon" may be input as "30" and "2 seconds", respectively.

Referring back to FIG. 8, the method then senses a haptic event in step 1110, where the controller 110 of the terminal device 100 senses the haptic event. The haptic event is designated in advance and is stored in the storage unit 175. Therefore, the controller 110 senses the haptic event designated in advance from the storage unit 175. The haptic event may occur in an application that is being executed in the terminal device 100. For example, the haptic event may occur while the game application is executed.

Figures 10A, 10B:
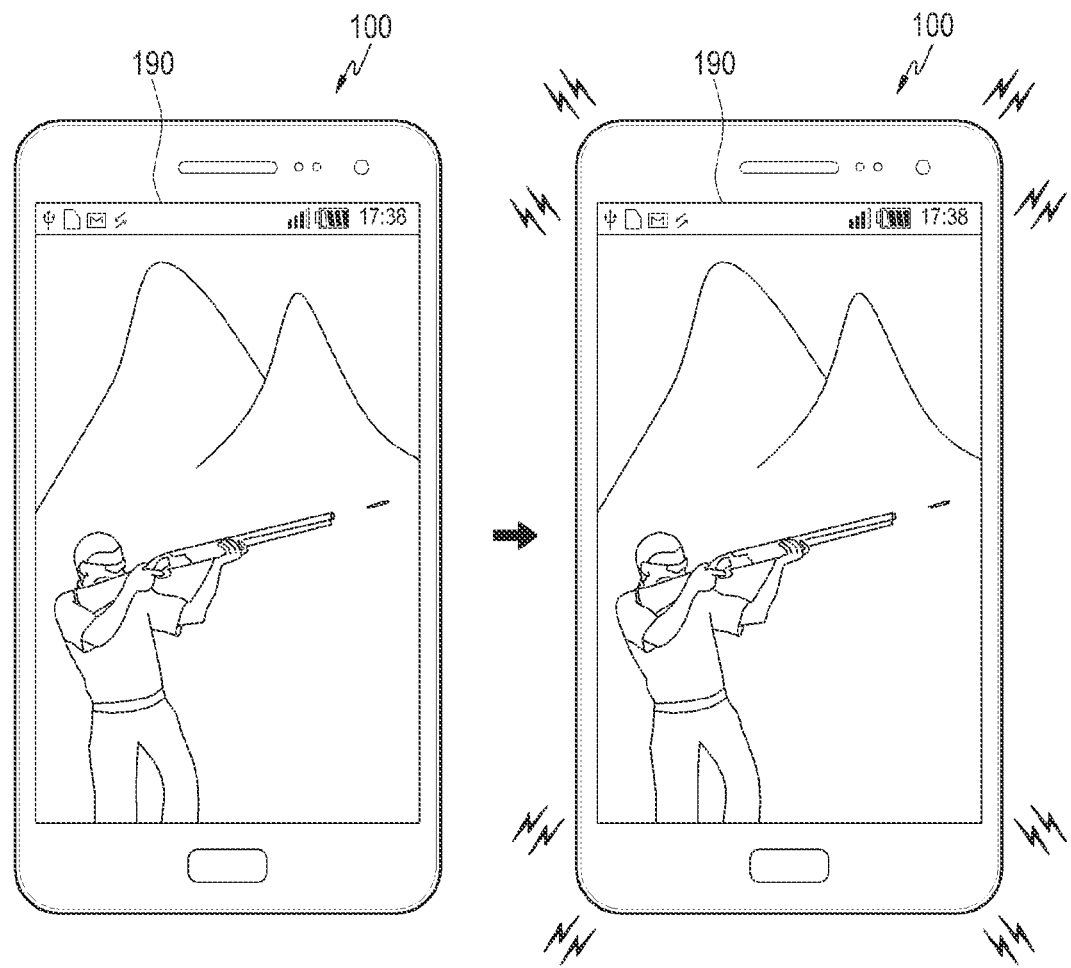
FIGS. 10A and 10B illustrate screens in which a haptic event occurs according to another embodiment of the present invention.

FIGS. 10A and 10B illustrate screens in which a haptic event occurs according to another embodiment of the present invention. Referring to FIG. 10, a game application is executed in the terminal device 100. For example, the haptic event may correspond to a big gun firing event that may occur while the game application is executed, as illustrated in FIG. 10A. As described above, the big gun firing event corresponding to the haptic event may be designated in advance and may be stored in the storage unit 175. Therefore, the controller 110 senses that the big gun firing event corresponding to the haptic event occurs.

The method then executes the non-physical parameter-based haptic function in the haptic engine and determines a vibration pattern corresponding to the haptic event in step 1120. The controller 110 controls the haptic engine to execute a non-physical parameter based haptic function in the haptic engine, and determines a vibration pattern corresponding to the haptic event.

The non-physical parameter-based haptic function may be determined through at least one classification. In this example, the non-physical parameter-based haptic function may be determined through a broad classification, an intermediate classification, and a fine classification. For example, the non-physical parameter-based haptic function may be determined to be HapticNP(V1, V2, V3). V1 indicates a parameter of a broad classification, V2 indicates a parameter of an intermediate classification, and V3 indicates a parameter of a fine classification.

The at least one classification includes a broad classification for determining a function, an intermediate classification for determining a detailed category, and a fine classification for determining selection of a situation. For example, the non-physical parameter-based haptic function classified as a broad classification, for example, "fire(B)" may be classified through an intermediate classification, such as, a "pistol (a)", a "big gun (b)", and a "cannon (c)". The intermediate classification may be classified through a fine classification, such as "a situation in which an impact is H/M/L".

When the broad classification is "fire (B)", the intermediate classification is the "big gun (b)", and the fine classification is "H", the non-physical parameter-based haptic function may be determined to be HapticNP(B, b, H).

Figures 11A, 11B:
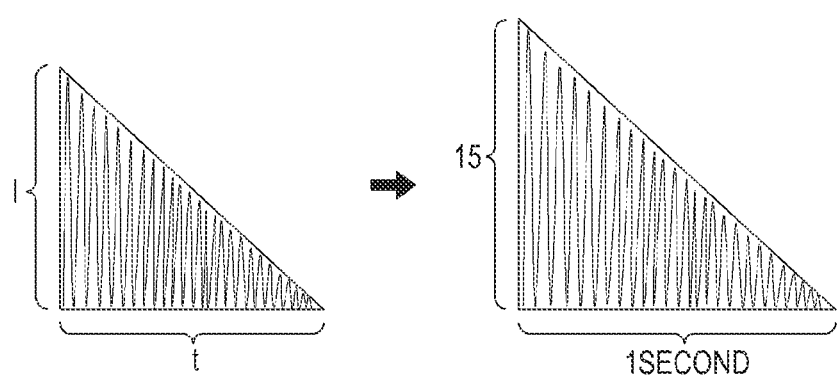
FIGS. 11A and 11B are diagrams illustrating a haptic pattern according to another embodiment of the present invention.

The non-physical parameter-based haptic function determined through the at least one classification may have a predetermined haptic pattern, and may be stored in the storage unit 175. When the non-physical parameter-based haptic function determined through the at least one classification is HapticNP(B, b, H), the predetermined haptic pattern corresponding to the non-physical parameter-based haptic function HapticNP(B, b, H) may be stored in the storage unit 175. For example, the haptic pattern may be a haptic pattern illustrated in FIG. 11A. Referring to FIG. 11A, the haptic pattern may be formed of a vertical axis of an intensity (I), and a horizontal axis of a duration (t). That is, the haptic pattern illustrated in FIG. 11A corresponds to a haptic pattern of which an intensity of a vibration gradually decreases from I to 0 during a time from 0 to t. The haptic pattern may include a frequency (f). Therefore, the haptic pattern corresponds to a frequency (f), and has a vibration of which an intensity gradually decreases from I to 0 during a time from 0 to t.

In this example, the controller 110 determines the vibration pattern corresponding to the haptic event using at least one of the input intensity and duration of the vibration pattern. For example, as described above, the input intensity and duration of the vibration pattern may be "15" and "1 second", respectively. The controller 110 may determine a haptic pattern corresponding to a frequency (f) of which an intensity of a vibration gradually decreases from 15 to 0 during a time from 0 to 1 second, as the vibration pattern, to correspond to the big gun firing event. The controller 110 uses the intensity and duration of the vibration pattern input for the haptic pattern of FIG. 11A, that is, "15" and "1 second", so as to determine, as the vibration pattern, the haptic pattern corresponding to a frequency (f) of which an intensity of a vibration gradually decreases from 15 to 0 during a time from 0 to 1 second, as illustrated in FIG. 11B. Therefore, the vibration pattern corresponding to the "big gun firing event" of FIG. 10A may be determined as shown in FIG. 11B.

Referring back to FIG. 8, the method then transfers the vibration pattern from the haptic engine to the device driver in step 1130. The controller 110 transfers the vibration pattern determined in the haptic engine to the device driver. In step 1140, the device driver drives the vibrator based on the vibration pattern, and embodies a haptic effect. The controller 110 controls the device driver to drive the vibrator 164 based on the vibration pattern, and embodies a haptic effect. For example, as illustrated in FIG. 10B, the controller 110 controls the device driver and drives the vibrator 164 based on the vibration pattern corresponding to the haptic event received from the haptic engine, and embodies a haptic effect by vibrating the terminal device 100. That is, as illustrated in FIG. 10A, the vibrator 164 is driven based on the vibration pattern corresponding to the big gun firing event occurring while the game application is executed, the terminal device 100 is vibrated, and a haptic effect may be embodied.

Therefore, the present invention receives an input of selection with respect to at least one of an intensity and a duration of a vibration pattern, determines a vibration pattern through applying at least one of the input intensity and duration of the vibration pattern to a haptic pattern corresponding to a haptic event, and drives a vibrator based on the determined vibration pattern.

Figure 12:
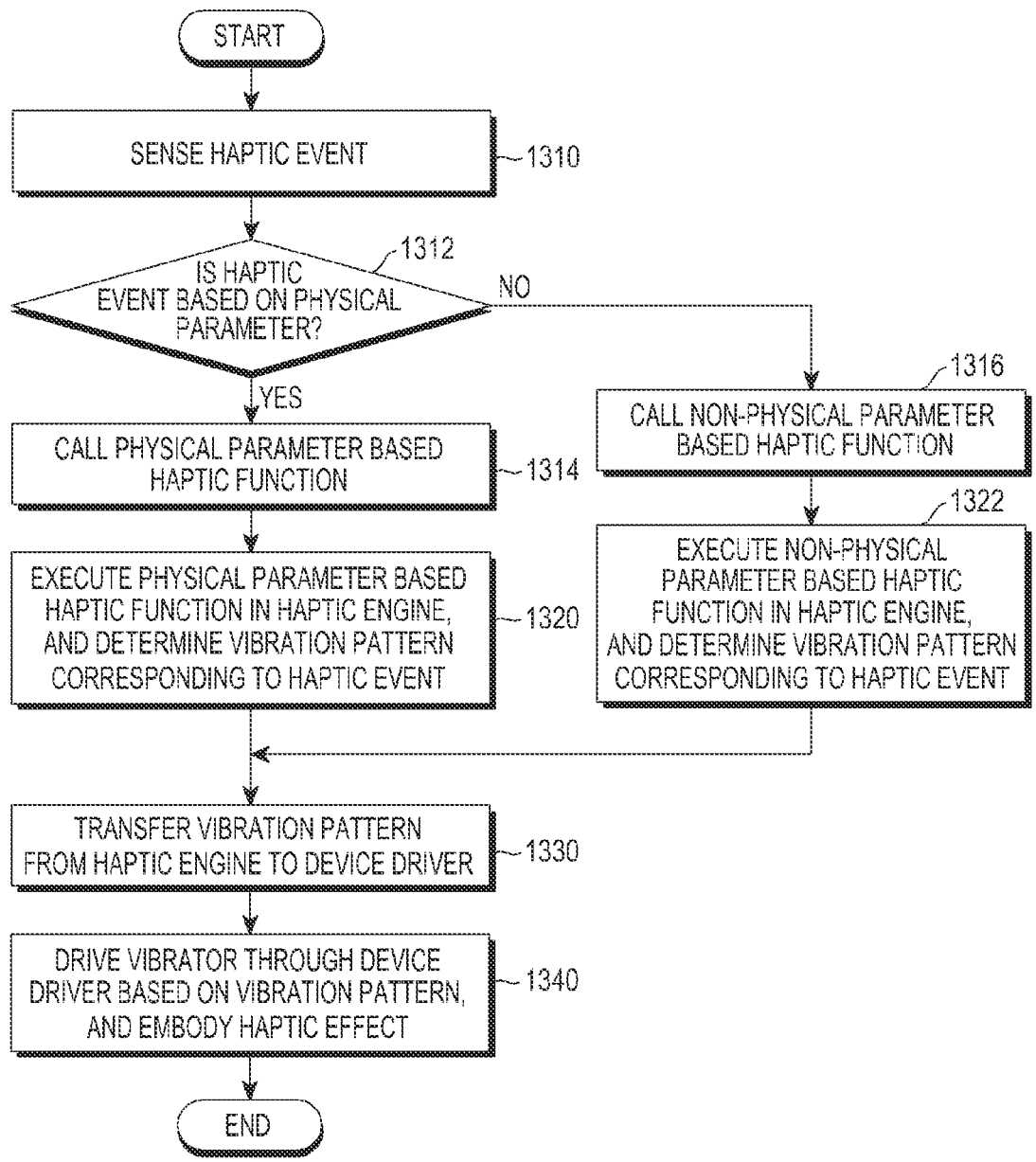
FIG. 12 is a flowchart illustrating a terminal device controlling method that provides a haptic effect using a haptic engine according to another embodiment of the present invention.

FIG. 12 is a flowchart of a terminal device controlling method that provides a haptic effect using a haptic engine according to another embodiment of the present invention.

Referring to FIG. 12, a haptic event is sensed in step 1310 by the controller 110 of the terminal device 100. The haptic event may be designated in advance and stored in the storage unit 175. Therefore, the controller 110 may sense the haptic event designated in advance from the storage unit 175. The haptic event may occur in an application that is being executed in the terminal device 100. The haptic event may correspond to a collision event in a game application and may be designated in advance and stored in the storage unit 175. Therefore, the controller 110 senses that the collision event corresponding to the haptic event occurs.

The method then determines whether the haptic event is based on a physical parameter in step 1312. In this example, the haptic event may be based on a physical parameter, or may be based on a non-physical parameter. When the haptic event occurs in a physical environment, it indicates that the haptic event is based on a physical parameter. Conversely, when the haptic event occurs in a non-physical environment, it indicates that the haptic event is based on a non-physical parameter. In this example, the physical environment refers to an environment where the haptic event may occur in the real world according to the laws of physics, whereas the non-physical environment refers to an environment that does not correspond to the physical environment.

In this example, the controller 110 calls a physical parameter-based haptic function when the haptic event is based on a physical parameter in step 1314. Conversely, the controller 110 calls a non-physical parameter-based haptic function when the haptic event is not based on a physical parameter in step 1316.

When the haptic event is based on a physical parameter, the method calls the physical parameter-based function to execute the physical parameter-based haptic function in the haptic engine, and determines a vibration pattern corresponding to the haptic event in step 1320. The physical parameter-based haptic function may be determined through at least one classification. For example, the physical parameter-based haptic function may be determined to be HapticP(Impulse, e, d, k1, k2, r). HapticP denotes a physical parameter-based haptic function. "Impulse" corresponds to a quantity of an impulse, and denotes mΔv. In this example, m denotes a mass, and v denotes a velocity. Also, "e" denotes a type of an event, and indicates a type of collision and a type of vibration. "d" denotes a detailed attribute of the event. "k1" and "k2" denote criterion values for determining a soft object and a hard object. "r" denotes a number of repetitions.

Conversely, when the haptic event is based on a non-physical parameter, the method calls the non-physical parameter-based haptic function in step 1316 so as to execute the non-physical parameter-based haptic function in the haptic engine, and determines a vibration pattern corresponding to the haptic event in step 1322. Here, the method of determining the vibration pattern corresponding to the haptic event by executing the non-physical parameter-based haptic function in the haptic engine is identical to the description that has been provided with reference to step 1020 of FIG. 4 and thus, it will be generally described. That is, the controller 110 controls the haptic engine so as to execute the non-physical parameter-based haptic function in the haptic engine, and determines the vibration pattern corresponding to the haptic event.

The non-physical parameter-based haptic function may be determined through at least one classification. In this example, the non-physical parameter-based haptic function may be determined through a broad classification, an intermediate classification, and a fine classification. For example, the non-physical parameter based haptic function may be determined to be HapticNP(V1, V2, V3). HapticNP denotes a non-physical parameter-based haptic function, V1 denotes a parameter of a broad classification, V2 denotes a parameter of an intermediate classification, and V3 denotes a parameter of a fine classification.

The non-physical parameter-based haptic function determined through the at least one classification may have a predetermined haptic pattern. That is, the predetermined haptic pattern corresponding to the non-physical parameter-based haptic function determined through the at least one classification may be stored in the storage unit 175. The haptic pattern may be a combination of a plurality of predetermined haptic patterns, as previously described.

In this example, the controller 110 may determine a frequency or a haptic pattern based on the intermediate classification, and may determine an intensity or a duration based on the fine classification. Therefore, the controller 110 determines an intensity, a duration, and a frequency with respect to the haptic pattern determined by executing the non-physical parameter-based haptic function, and determines the vibration pattern corresponding to the haptic event.

In FIG. 12, the method then transfers the vibration pattern from the haptic engine to the device driver in step 1330. The controller 110 transfers the vibration pattern determined in the haptic engine to the device driver.

The device driver then drives the vibrator based on the vibration pattern and embodies a haptic effect in step 1340. The controller 110 controls the device driver to drive the vibrator 164 based on the vibration pattern, and embodies a haptic effect.

Therefore, whether a haptic event is based on a physical parameter or a non-physical parameter is determined. A physical parameter-based haptic function is called when the haptic event is based on the physical parameter, and a non-physical parameter-based haptic function is called when the haptic event is not based on a physical parameter.

A terminal device controlling method that provides a haptic effect using a haptic engine will be described according to a first embodiment of the present disclosure.

Referring again to FIG. 8, in step 1100, the controller 110 receives an input of selection with respect to at least one of an intensity and a duration of a vibration pattern. That is, the controller 110 may receive an input of selection with respect to at least one of an intensity and a duration of a vibration pattern through the input/output module 160, or for example, through the touch screen 190. An input of an intensity and a duration of a vibration pattern of "included in" "pit-a-" of "feeling" may be received through the touch screen 190. For example, the intensity and the duration of the vibration pattern of "tension" included in "pit-a-pat" of "feeling" may be input as "10" and "2 seconds", respectively.

Subsequently, a haptic event is sensed in step 1110 by controller 110 of the terminal device 100. The haptic event may be designated in advance and stored in the storage unit 175. Therefore, the controller 110 may sense the haptic event designated in advance from the storage unit 175. The haptic event may occur in an application that is being executed in the terminal device 100, such as a game application. For example, the haptic event may be a tension generating event that may occur while the game application is executed. As described above, the tension generating event corresponding to the haptic event may be designated in advance and stored in the storage unit 175. Therefore, the controller 110 may sense that the tension generating event corresponding to the haptic event occurs.

In step 1120, a non-physical parameter-based haptic function is executed, and a vibration pattern is determined corresponding to the haptic event. The controller 110 controls the haptic engine to execute a non-physical parameter-based haptic function in the haptic engine, and determines a vibration pattern corresponding to the haptic event.

The non-physical parameter-based haptic function may be determined through at least one classification, including a broad classification, an intermediate classification, and a fine classification. That is, the broad classification determines a function, the intermediate classification determines a detailed category, and the fine classification determines selection of a situation. For example, the non-physical parameter-based haptic function classified as the broad classification such as "feeling (C)" may be classified through the intermediate classification such as "pit-a-pat (b)". The intermediate classification may be classified through the fine classification such as "tension (c)". The non-physical parameter-based haptic function may be determined to be, for example, HapticNP(C, b, c).

Figure 13:
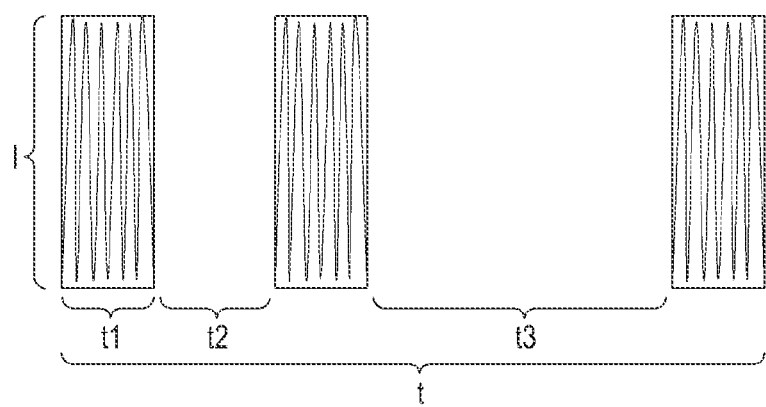
FIG. 13 is a diagram illustrating a haptic pattern according to a first embodiment of the present invention.

The non-physical parameter-based haptic function determined through the at least one classification may have a predetermined haptic pattern. That is, a predetermined haptic pattern corresponding to the non-physical parameter based haptic function determined through the at least one classification may be stored in the storage unit 175. For example, when the non-physical parameter based haptic function determined through the at least one classification is HapticNP(C, b, c), a predetermined haptic pattern corresponding to HapticNP(C, b, c) may be stored in the storage unit 175. For example, the haptic pattern may be a haptic pattern illustrated in FIG. 13. Referring to FIG. 13, the haptic pattern may be formed of a vertical axis of an intensity (I) and a horizontal axis of a duration (t). The haptic pattern is formed of an intensity of I during a time of t1, an intensity of 0 during a time of t2, an intensity of I during a time of subsequent t1, an intensity of 0 during a time of t3, and an intensity of I during a time of subsequent t1. The haptic pattern may include a frequency (f).

In this example, the controller 110 may determine the vibration pattern corresponding to the haptic event using at least one of the input intensity and duration of the vibration pattern. For example, as described above, the input intensity and duration of the vibration pattern may be "10" and "2 seconds", respectively. The controller 110 determines, as the vibration pattern during a total of 2 seconds, a haptic pattern corresponding to a frequency (f) that is formed of an intensity of 10 during a time of t1, an intensity of 0 during a time of t2, an intensity of 10 during a time of subsequent t1, an intensity of 0 during a time of t3, and an intensity of 10 during a time of subsequent t1, to correspond to the tension generating event. Therefore, the vibration pattern of FIG. 13 may be determined to correspond to the "tension generating event".

In step 1130, the vibration pattern is transferred from the haptic engine to a device driver. The controller 110 transfers the vibration pattern determined in the haptic engine to the device driver.

The device driver then drives the vibrator based on the vibration pattern, and embodies a haptic effect in step 1140, under control of the controller 110. That is, the vibrator 164 is driven based on the vibration pattern corresponding to the tension generating event occurring while the game application is executed, the terminal device 100 is vibrated, and a haptic effect may be embodied.

Therefore, according to the first embodiment, a haptic effect is embodied by receiving an input of selection with respect to at least one of an intensity and a duration of a vibration pattern, determining a vibration pattern through applying at least one of the input intensity and duration of the vibration pattern to a haptic pattern corresponding to a haptic event, such as "a tension generating event", and driving a vibrator based on the determined vibration pattern.

A terminal device controlling method that provides a haptic effect using a haptic engine according to a second embodiment of the present invention will be described.

Referring again to FIG. 8, an input of selection with respect to at least one of an intensity and a duration of a vibration pattern is received in step 1100. The controller 110 receives an input of selection with respect to at least one of an intensity and a duration of a vibration pattern, through the input/output module 160, or for example, through the touch screen 190. An input of an intensity and a duration of a vibration pattern of "between hard objects" included in "collision" from among haptic events may be received through the touch screen 190. For example, the intensity and the duration of the vibration pattern of "between hard objects" included in "collision" may be input as "5" and "0.5 seconds", respectively.

Subsequently, a haptic event is sensed in step 1110 by the controller 110 of the terminal device 100. The haptic event is designated in advance and stored in the storage unit 175, and the controller 110 may sense the haptic event designated in advance from the storage unit 175. The haptic event may occur in an application that is being executed in the terminal device 100. For example, the haptic event may be a collision event between hard objects that may occur while the game application is executed. For example, the collision event between hard objects may be a collision event between billiard balls 301 and 302, as illustrated in FIG. 14A.

The method then executes a non-physical parameter-based haptic function, and determines a vibration pattern corresponding to the haptic event in step 1120. The controller 110 controls the haptic engine to execute a non-physical parameter-based haptic function in the haptic engine, and determines a vibration pattern corresponding to the haptic event.

The non-physical parameter-based haptic function may be determined through at least one classification. In this example, the non-physical parameter based haptic function may be determined through a broad classification for determining a function, and an intermediate classification for determining a detailed category. For example, the non-physical parameter-based haptic function classified as the broad classification such as "collision (F)" may be classified through the intermediate classification such as "between hard objects (B8)". The non-physical parameter based haptic function may be determined to be, for example, HapticNP(F, B8).

The non-physical parameter-based haptic function determined through the at least one classification may have a predetermined haptic pattern, which may be stored in the storage unit 175. For example, when the non-physical parameter-based haptic function determined through the at least one classification is HapticNP(F, B8), a predetermined haptic pattern corresponding to the non-physical parameter-based haptic function HapticNP(F, B8) may be stored in the storage unit 175. For example, the haptic pattern may be a haptic pattern illustrated in FIG. 15A. Referring to FIG. 15A, the haptic pattern may be formed of a vertical axis of an intensity (I) and a horizontal axis of a duration (t). The haptic pattern has an intensity of I during a time of t1, and the intensity decreases from I to 0 during a time of t2. The haptic pattern may include a frequency (f).

In this example, the controller 110 determines the vibration pattern corresponding to the haptic event using at least one of the input intensity and duration of the vibration pattern. For example, as described above, the input intensity and duration of the vibration pattern may be "5" and "0.5 seconds", respectively. The controller 110 determines, as the vibration pattern during a total of 0.5 seconds, a haptic pattern corresponding to a frequency (f) that has an intensity of 5 during a time of t1, and an intensity that decreases from 5 to 0 during a time of t2, to correspond to the collision event between the hard objects. Therefore, the vibration pattern of FIG. 15A may be determined to correspond to the "collision event between hard objects".

Subsequently, the vibration pattern is transferred from the haptic engine to a device driver in step 1130. The controller 110 transfers the vibration pattern determined in the haptic engine to the device driver.

The device driver then drives the vibrator based on the vibration pattern, and embodies a haptic effect in step 1140. The controller 110 controls the device driver to drive the vibrator 164 based on the vibration pattern, and embodies a haptic effect. That is, the vibrator 164 is driven based on the vibration pattern corresponding to the "collision event between hard objects" occurring while the game application is executed, the terminal device 100 is vibrated, and a haptic effect may be embodied.

Therefore, according to the second embodiment a haptic effect is embodied by receiving an input of selection with respect to at least one of an intensity and a duration of a vibration pattern, determining a vibration pattern by applying at least one of the input intensity and duration of the vibration pattern to a haptic pattern corresponding to a haptic event such as a "collision event between hard objects", and driving a vibrator based on the determined vibration pattern.

A terminal device controlling method that provides a haptic effect using a haptic engine according to a third embodiment of the present invention will be described.

Referring again to FIG. 8, an input of selection with respect to at least one of an intensity and a duration of a vibration pattern is received in step 1100. The controller 110 receives an input of selection with respect to at least one of an intensity and a duration of a vibration pattern, through the input/output module 160, or for example, through the touch screen 190. An input of an intensity and a duration of a vibration pattern of "between hard and soft objects" included in "collision" from among haptic events may be received through the touch screen 190, and may be, for example, input as "3" and "0.4 seconds", respectively.

A haptic event is sensed in step 1110. The controller 110 of the terminal device 100 senses a haptic event. The haptic event is designated in advance and stored in the storage unit 175, and the controller 110 may sense the haptic event designated in advance from the storage unit 175. The haptic event may occur in a game application that is being executed in the terminal device 100. For example, the haptic event may be a collision event between hard and soft objects that may occur while the game application is executed. For example, the "collision event between hard soft objects" may be a collision event between a baseball 312 and a bat 311, as illustrated in FIG. 14B.

A non-physical parameter-based haptic function in the haptic engine is executed, and a vibration pattern corresponding to the haptic event is determined in step 1120. The controller 110 controls the haptic engine to execute a non-physical parameter-based haptic function in the haptic engine, and determines a vibration pattern corresponding to the haptic event.

The non-physical parameter based haptic function may be determined through at least one classification. In this example, the non-physical parameter based haptic function may be determined through a broad classification for determining a function, and an intermediate classification for determining a detailed category. For example, the non-physical parameter-based haptic function classified as the broad classification such as "collision (F)" may be classified through the intermediate classification such as "between hard and soft objects (B7)". The non-physical parameter-based haptic function may be determined to be, for example, HapticNP(F, B7).

The non-physical parameter-based haptic function determined through the at least one classification may have a predetermined haptic pattern, and may be stored in the storage unit 175. For example, when the non-physical parameter-based haptic function determined through the at least one classification is HapticNP(F, B7), a predetermined haptic pattern corresponding to the non-physical parameter-based haptic function HapticNP(F, B7) may be stored in the storage unit 175. For example, the haptic pattern may be a haptic pattern illustrated in FIG. 15B. Referring to FIG. 15B, the haptic pattern may be formed of a vertical axis of an intensity (I) and a horizontal axis of a duration (t). The haptic pattern has an intensity that increases from I0 to 0I during a time of t2, and has an intensity of I during a time of t1. The haptic pattern may include a frequency (f).

In this example, the controller 110 determines the vibration pattern corresponding to the haptic event using at least one of the input intensity and duration of the vibration pattern. For example, as described above, the input intensity and duration of the vibration pattern may be "3" and "0.4 seconds", respectively. The controller 110 determines, as the vibration pattern during a total of 0.4 seconds, a haptic pattern corresponding to a frequency (f) that has an intensity that increases from 0 to 03 during a time of t2 and an intensity of 3 during a time of t1, to correspond to the collision event between hard and soft objects. Therefore, the vibration pattern of FIG. 15B may be determined to correspond to the "collision event between hard and soft objects".

The vibration pattern is transferred from the haptic engine to a device driver in step 1130. The controller 110 transfers the vibration pattern determined in the haptic engine to the device driver.

The device driver then drives the vibrator based on the vibration pattern, and embodies a haptic effect in step 1140. The controller 110 controls the device driver to drive the vibrator 164 based on the vibration pattern, and embodies a haptic effect. That is, the vibrator 164 is driven based on the vibration pattern corresponding to the collision event between hard and soft objects occurring while the game application is executed, the terminal device 100 is vibrated, and a haptic effect may be embodied.

Therefore, according to the third embodiment a haptic effect is embodied by receiving an input of selection with respect to at least one of an intensity and a duration of a vibration pattern, determining a vibration pattern by applying at least one of the input intensity and duration of the vibration pattern to a haptic pattern corresponding to a haptic event, such as a "collision event between hard and soft objects", and driving a vibrator based on the determined vibration pattern.

It will be appreciated that the embodiments of the present invention may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. A web widget manufacturing method of the present invention can be realized by a computer or a portable terminal including a controller and a memory, and it can be seen that the memory corresponds to an example of the storage medium which is suitable for storing a program or programs including instructions by which the embodiments of the present invention are realized, and is machine readable. Accordingly, the present invention includes a program for a code implementing the apparatus and method described in the appended claims and a machine (a computer or the like)-readable storage medium for storing the program. Moreover, such a program as described above can be electronically transferred through an arbitrary medium such as a communication signal transferred through cable or wireless connection, and the present invention properly includes things equivalent to that.

Further, the device can receive the program from a program providing apparatus connected to the device wirelessly or through a wire and store the received program. The program supply apparatus may include a program that includes instructions to execute the embodiments of the present disclosure, a memory that stores information or the like required for the embodiments of the present disclosure, a communication unit that conducts wired or wireless communication with the electronic apparatus, and a control unit that transmits a corresponding program to a transmission/reception apparatus in response.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of controlling a terminal device that provides a haptic effect, the method comprising:

sensing a haptic event;

determining a vibration pattern corresponding to the haptic event based on a combination of at least one of predetermined haptic patterns corresponding to at least one classification;

and controlling a vibrator to drive based on the vibration pattern so as to embody the haptic effect, wherein the at least one classification includes a classification for determining a type of the haptic event, a classification for determining a detailed category of the determined type of the haptic event, and a classification for determining a detailed feature of the haptic event.

2. The method of claim 1, wherein the classification for determining the detailed category of the determined type of the haptic event determines a frequency, and the classification for determining the detailed feature of the haptic event determines an intensity or a duration.

3. The method of claim 2, wherein the haptic pattern includes a combination of a plurality of predetermined haptic patterns.

4. The method of claim 1, further comprising:

receiving an input of selection with respect to at least one of an intensity and a duration of the vibration pattern.

5. A device that provides a haptic effect, the device comprising:
- a controller configured to sense a haptic event;
- determine a vibration pattern corresponding to the haptic event based on a combination of at least one of predetermined haptic patterns corresponding to at least one classification, and control
- a vibrator to drive based on the vibration pattern so as to embody a haptic effect;
- the vibrator that vibrates the device; and
- a storage unit that stores the vibration pattern corresponding to the haptic event,
- wherein the at least one classification includes a classification for determining a type of the haptic event, a classification for determining a detailed category of the determined type of the haptic event, and a classification for determining a detailed feature of the haptic event.

6. The device of claim 5, wherein the classification for determining the detailed category of the determined type of the haptic event determines a frequency, and the classification for determining the detailed feature of the haptic event determines an intensity or a duration.

7. The device of claim 6, wherein the haptic pattern comprises a combination of a plurality of predetermined haptic patterns.

8. The terminal device of claim 5, wherein the controller receives an input of selection with respect to at least one of an intensity and a duration of the vibration pattern.

* * * * *